March 15, 1932. J. J. WALLACE 1,849,649
REVOLVING SCREEN COTTON SEPARATOR
Filed Jan. 30, 1931 2 Sheets-Sheet 1
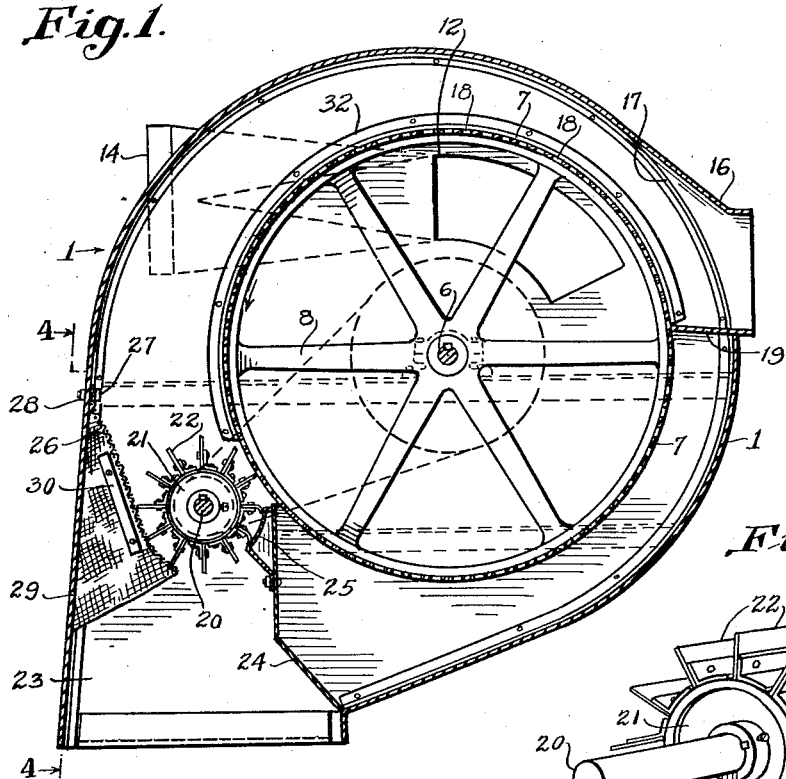
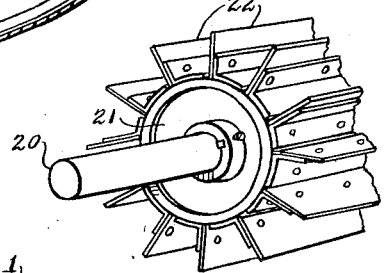
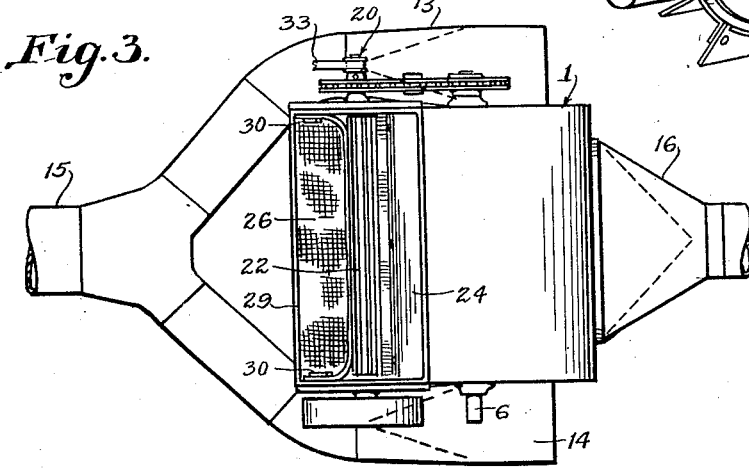
Inventor
Jeffrey J. Wallace
By Mason Fenwick Lawrence
Attorneys

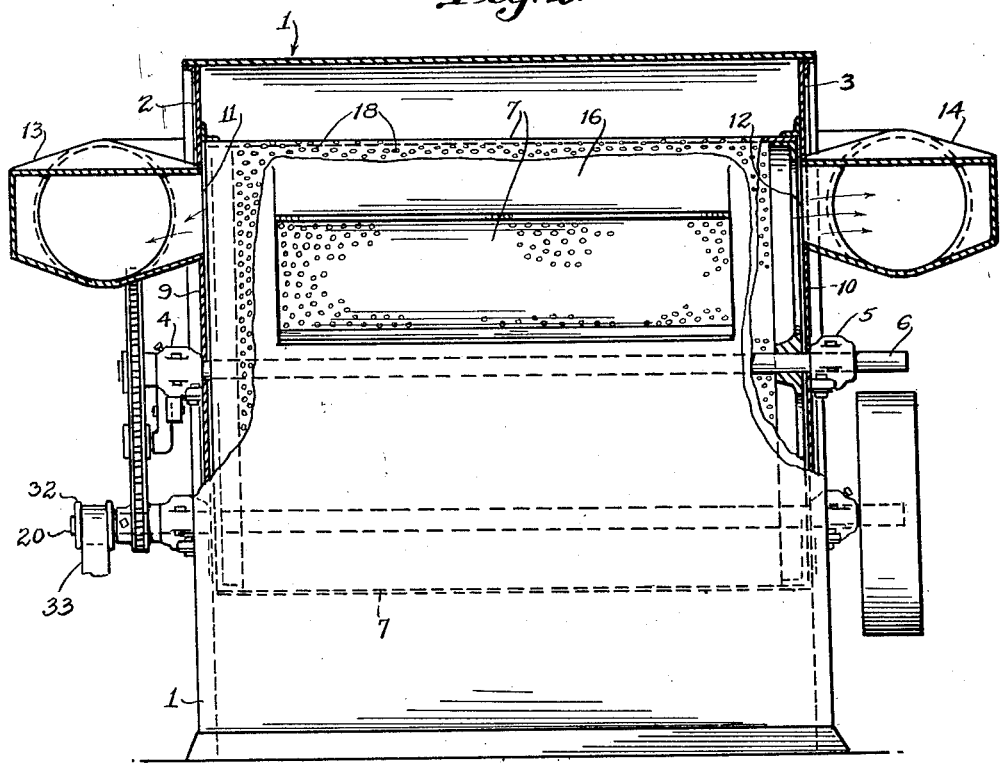

Patented Mar. 15, 1932

1,849,649

UNITED STATES PATENT OFFICE

JEFFREY JOHN WALLACE, OF AMITE, LOUISIANA, ASSIGNOR TO GULLETT GIN COMPANY, OF AMITE, LOUISIANA

REVOLVING SCREEN COTTON SEPARATOR

Application filed January 30, 1931. Serial No. 512,363.

The invention forming the subject matter of this application is a cotton separator designed to separate cotton from air in a pneumatic conveyor for feeding seed cotton from a wagon or storage bin to a distributor or cleaner.

The main object of the invention is to provide a separator adapted to discharging a thick or thin bat of cotton from a separator to a cleaner or distributor, and in which the discharged bat will be of substantially uniform thickness throughout the entire width of the separator drum.

Another object of the invention is to simplify separators of this type, in order to render them cheaper to manufacture and easier to clean, and to eliminate possibility of their choking, as is usually the case where cotton is delivered from the separator by a paddle doffer roller in which the spaces between the paddles are always filled.

A further object of the invention is to discharge the separated cotton evenly to the cleaner or distributor, to prevent the accumulation of cotton on the separating drum as well as to eliminate any retroactive suction whereby the cotton bat might be carried back into the separator air passage.

Other objects of the invention will become apparent as the detailed description thereof proceeds.

In the drawings:

Fig. 1 is a central vertical section through a separator forming a practical embodiment of this invention;

Fig. 2 is a front elevation of the separator shown in Fig. 1, parts thereof being broken away and shown in section to illustrate details of construction;

Fig. 3 is a bottom plan view of the device shown in Fig. 1, the scale of the drawings being reduced;

Fig. 4 is a fragmentary section, taken on the line 4—4 of Fig. 1, and illustrating details of construction of a flexible valve forming part of the invention; and Fig. 5 is a fragmentary perspective view of a doffer roller employed in this separator.

As shown in the drawings, the invention comprises a main casing 1 which is substantially cylindrical throughout its length. End walls 2 and 3 for casing 1 are provided with bearings 4 and 5 in which is journaled a shaft 6. A foraminous drum 7 is secured concentrically to the shaft 6 by the spider elements 8, or in any other suitable manner.

The casing 1 has its end walls 2 and 3 provided with apertures 11 and 12, respectively, to form passageways for the discharge of air from the interior of the drum into pipes 13 and 14, which are bent around the casings 1 as branches meeting in a common suction pipe 15 connected to a suction fan (not shown), or to any other means for drawing air from the cylinder through said branches and pipe.

The drum 7 is mounted eccentrically of the casing 1, as shown in Fig. 1, and a feed pipe 16, secured to the casing 1 communicates with an aperture 17 in said casing for the purpose of admitting seed cotton into the space between the casing and the periphery of the drum 7. It will be apparent from the drawing that the air for sucking in the cotton to the separator, is drawn through the pipe 16 and through the apertures 18 in a periphery of the drum 7, and is discharged from the interior of the drum 7, through the openings 11 and 12 and branches 13 and 14 to the pipe 15.

The combined area of the openings 11 and 12 is at least equal to that of the cross sectional area of the pipe 15 and these openings 11 and 12 are of equal area. By this construction the air suction is evenly distributed throughout the length of the drum 7, and the seed cotton therefore evenly distributed in a comparatively thin bat throughout the length of the drum.

In order to direct the seed cotton on to the drum a baffle plate 19 forming a continuation of the feed pipe 16 extends across the space between the casing 1 and the drum 7. The distance between the interior wall of the casing 1 and the drum 7 increases gradually from the entrance to the discharge end thereof.

Adjacent the discharge end of the separator, there is mounted a shaft 20 on which is keyed a doffer roller 21 provided with a radial paddle 22 preferably made of some flexible material such as rubber. The shaft 20 is so located relative to the shaft 6; and the doffer roller is of such dimensions that the paddles act as wipers, in contact with the drum 7 to wipe the cotton bat from the periphery of the drum and out through the discharge outlet 23.

To prevent backward suction of air through the discharge outlet 23 a baffle plate 24 extends between the end walls 9 and 10 of the casing and into close contact with the periphery of the drum to form a substantially air tight chamber for said drum between the discharge outlet 23 and the baffle plate 19. A curved plate 25 extends across the baffle plate 24 between the ends of casing 1, and its curve is struck on an arc concentric with the axis of the shaft 20. The distance between the doffer roller 21 and the curved plate 25 is less than the width of the paddles 22; and the curved surface of plate 25 is of such width that there are always at least two of the paddles wiping thereon to prevent suction of air through the discharge aperture 23 between the baffle plate 24 and curved plate 25 and the periphery of the doffer roller 21.

To cooperate with the doffer roller 21 in preventing the retroactive movement of air through the discharge opening, the device is provided with a sheet of flexible material 26, extending across the casing 1 from one end wall to the other. This sheet may be of any suitable material such as two-ply canvas ducking or cloth. The said sheet 26 has its upper edge secured to the casing 1 by means of a clamping plate 27 and bolts 28 and has its opposite ends suitably secured to the straight wall 29 of the discharge outlet 23. This sheet 26 forms, then, a sort of inverted pocket, normally held by air suction against the flexible paddles 22 of the doffer roller. The opposite end walls 2 and 3 have angle irons 30 secured thereto over the triangular end folds of the sheet 26 and adjacent the path of movement of the outer ends of the paddle blade 22 to limit the movement of this flexible cloth valve.

The sheet 26 forms a species of flexible valve which not only makes an air tight connection with the casing 1 and its end walls 2 and 3, but also serves to form an air tight closure for the spaces between the paddles 22 of the doffer roller 21. At the same time, it will permit bats of different thicknesses to pass readily from the surface of the drum 7 and over the doffer roller 21 to the discharge outlet 23.

To form an air tight joint between the casing 1 and the outer end of the drum 7, suitable packing strips are secured to the end walls 2 and 3 in close fitting contact with the opposite ends of the drum 7.

As shown in Fig. 2 of the drawings, the shaft 20 has a driving pulley 32 secured to one end thereof and to be rotated by a belt 33 connected to any suitable source of power. The shaft 6 is driven in the opposite direction to the shaft 20 by any suitable pulley or gear connection with the shaft 20, and at a peripheral rate of rotation slightly less than the peripheral rate of rotation of the doffer roller, in order to insure proper wiping action of the doffer roller on the periphery of drum 7.

The discharge of the seed cotton continuously in a relatively thin bat, distributed throughout the entire length of the separator drum, prevents the possibility of choking the separator. This also presents the cotton in better shape for operation by the cleaner than is possible where the cotton is discharged from completely filled doffer rollers.

What I claim is:

1. A cotton separator comprising a substantially cylindrical casing having a discharge conduit toward the one end thereof, a foraminous drum rotatably mounted in said casing, means for drawing a current of air through the periphery of said drum and from the interior thereof, a doffer roller rotatably mounted in said discharge conduit and having flexible radial blades in wiping contact with said drum, and a sheet of flexible material secured to said casing and constantly in wiped contact with at least two of said blades to form therewith an air seal for said discharge conduit.

2. A cotton separator comprising a substantially cylindrical casing having a discharge conduit at one side thereof, a foraminous drum rotatably mounted in said casing, an inlet conduit connected to the other side of said casing, means for drawing a current of air through said inlet conduit and the apertures in the periphery of said drum, a doffer roller in the discharge conduit having flexible blades in wiping contact with said foraminous drum, a sheet of flexible material secured to the walls of said discharge conduit and constantly in wiped contact with at least two of the said blades to form an air seal for the discharge conduit, and means on the end walls of said casing to limit the movement of said sheet relative to said roller.

3. A cotton separator comprising a substantially cylindrical casing having a discharge conduit at one side thereof, a foraminous drum rotatably mounted in said casing, an inlet conduit connected to the other side of said casing, means for drawing a current of air through said inlet conduit and the apertures in the periphery of said drum, a doffer roller in the discharge conduit having flexible blades in wiping contact with said foraminous drum, a sheet of flexible material secured to the walls of said discharge conduit in constant wiped contact with at least two of the said blades, means on the end walls of said casing to limit the movement of said sheet relative to said rollers, and a curved wiper plate in contact with at least two of said blades throughout their length to cooperate with said sheet in preventing suction of air through said discharge conduit.

In testimony whereof I affix my signature.

JEFFREY JOHN WALLACE.